United States Patent [19]

Adkins

[11] Patent Number: 5,107,893

[45] Date of Patent: Apr. 28, 1992

[54] APPARATUS FOR HANDLING AGRICULTURAL CHEMICALS

[76] Inventor: James P. Adkins, Rte. 1, Vienna, Ga.

[21] Appl. No.: 641,895

[22] Filed: Jan. 16, 1991

[51] Int. Cl.$^5$ ............................................ G05D 11/03
[52] U.S. Cl. ................................................ 137/599.1
[58] Field of Search ............ 137/101.11, 205.5, 564.5, 137/599.1

[56] References Cited

U.S. PATENT DOCUMENTS

| | | | |
|---|---|---|---|
| 1,946,474 | 2/1934 | Banks et al. | 137/564.5 X |
| 2,233,965 | 3/1941 | Strovink | 137/599.1 |
| 2,680,715 | 6/1954 | Cook | 137/101.11 |
| 3,913,606 | 10/1975 | Anderson, Jr. | |
| 3,923,203 | 12/1975 | Anderson, Jr. | |
| 4,074,685 | 2/1978 | Dodd | 137/101.11 |
| 4,092,993 | 6/1978 | Stevenson | |
| 4,108,336 | 8/1978 | Anderson, Jr. | |
| 4,144,901 | 3/1979 | Stevenson | |
| 4,162,745 | 7/1979 | Anderson, Jr. | |
| 4,386,637 | 6/1983 | Buchanan et al. | |
| 4,580,703 | 4/1986 | Anderson, Jr. | |

*Primary Examiner*—Stephen M. Hepperle
*Attorney, Agent, or Firm*—Cushman, Darby & Cushman

[57] ABSTRACT

Apparatus for connection within a hose extending from a nurse tank assembly to a tractor mounted spray tank for utilizing a source of water under pressure within the hose from the nurse tank assembly to withdraw a chemical from a container and thereafter to clean the container in such a way that the chemical is mixed and delivered with the water utilized to the spray tank through the hose, said apparatus comprising a hose connecting unit, a portable unit, and a flexible hose assembly extending between the two units. The hose connecting unit includes a flow directing valve selectively operable to direct the water source (1) directly to the spray tank; or (2) through the portable unit. The portable unit includes a flow path having therein a flow control valve, a rinse water valve, and a venturi communicating with a chemical withdrawing conduit enterable within a chemical container, and a rinse water directing mechanism under the control of the rinse water valve cooperating with the chemical withdrawing conduit.

30 Claims, 4 Drawing Sheets

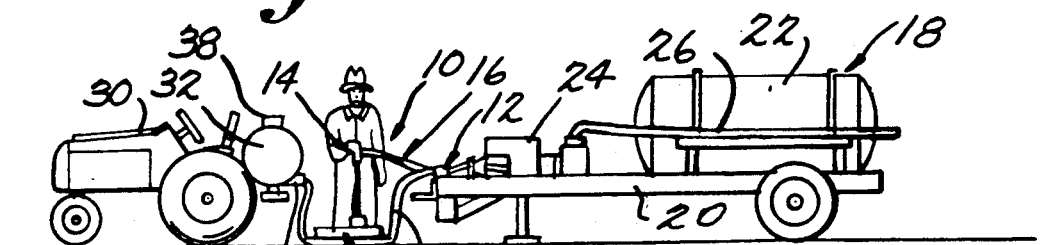
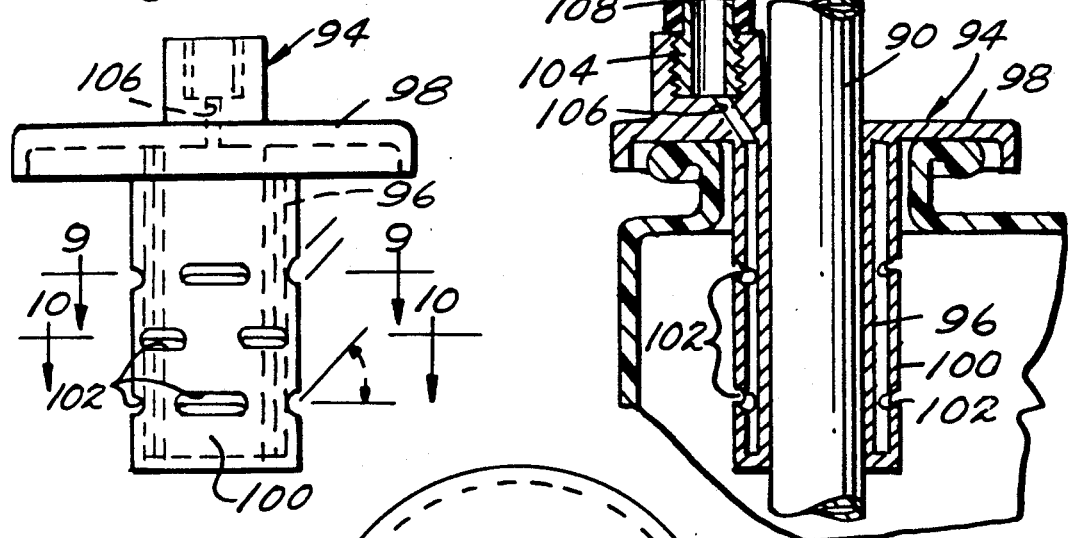
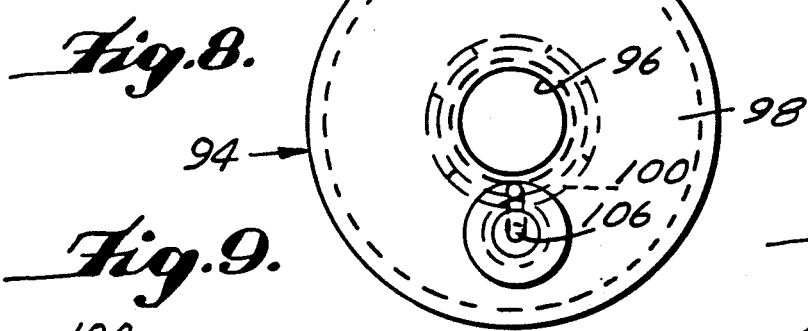
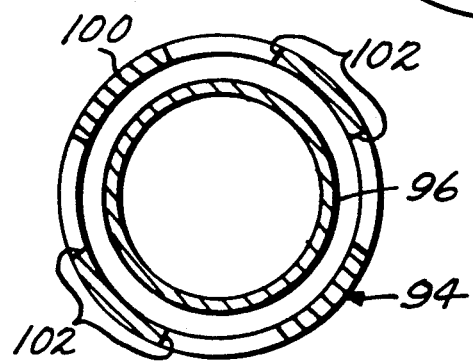
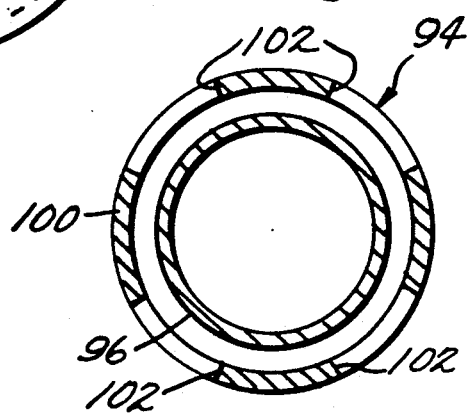

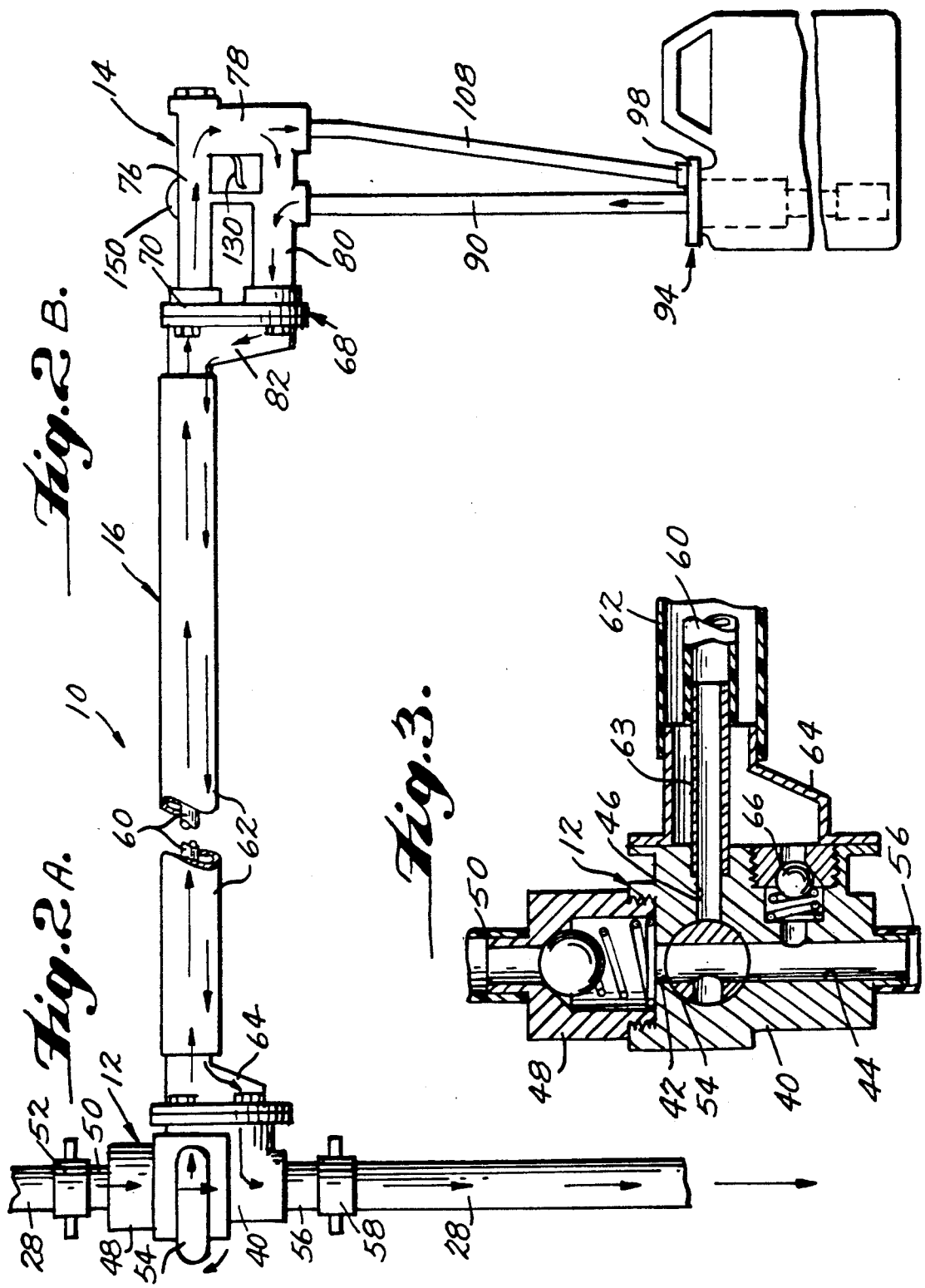

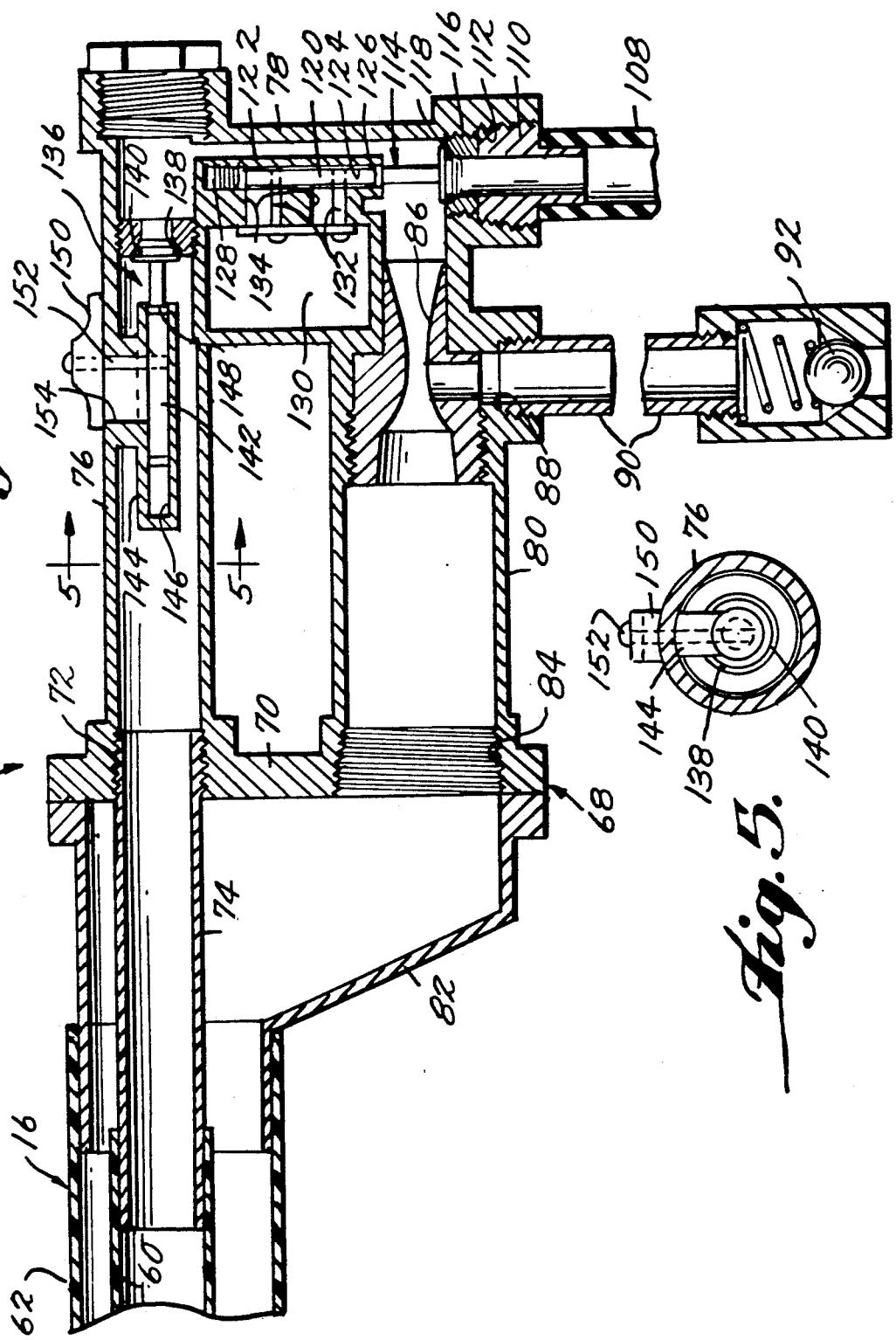

APPARATUS FOR HANDLING AGRICULTURAL CHEMICALS

This invention relates to the handling of potentially toxic materials and more particularly to the handling of chemicals used in agricultural practices.

Present day agricultural practices usually require the farmer to mix and apply a fairly large amount of chemicals which can have a toxic effect. The toxic effect can be direct, through accidental direct exposure, or indirect, as where accidental spills are allowed to leach into the ground near a water well or the like. Such chemicals include insecticides and the like which usually come in containers in a concentrated liquid form although wettable powders, dry flowables, and dispersable granules, liquid or dry fertilizers, slurries and many other materials of this nature are also sometimes used and are herein contemplated. Accidental spills of the concentrated liquid or other chemical usually occurs during handling and mixing. Often the practice is simply for the farmer to remove the container lid and lift the container up to the upper level of a spray tank and then to pour in an amount which is to be mixed with the water. The usual practice is to mix at least some of the water into the tank after the chemical has been added thereto in order to ensure that the chemical will be mixed throughout the water added to the spray tank.

Where practices of this sort are carried out in the same area at a place near the water source, as, for example, near the well pump, there is an extreme danger of not only a large spill but that periodic unrecovered spillage of small amounts will seep through the ground and ultimately cause a toxic effect on the well water. One practice which has been suggested for minimizing this type of exposure is to mix the chemicals in the field at different locations remote from the well. There are currently a number of so-called nurse tank assemblies commercially available which are useful for this purpose. Such assemblies usually include a wheel frame basically of the tandem trailer type on which is mounted a large nurse tank or container of a great capacity such as a thousand gallons or the like. A gasoline engine operated pump assembly is mounted on the trailer frame and has its suction end connected to the tank through a suction hose and its pressure side connected with a hose which is capable of being extended to the spray tank such as a tractor mounted spray tank or the like. Even though the handling and mixing operation is thus transported to a remote location from the well, there still remains a danger from spills to the personnel involved as well as the danger of large spills.

There are commercially available devices for facilitating the mixing of the chemicals from the containers with the water in the tractor mounted spray tank. The commercially available instructions indicate that the devices are operating under U.S. Pat. No. 4,162,745 or U.S. Pat. No. 4,580,703. Other related patents by the same inventor are U.S. Pat. Nos. 3,913,606, 3,923,203, and 4,108,336. Additional patents of interest include U.S. Pat. Nos. 4,092,993, 4,144,901, and 4,386,637. Despite the available commercial usage and the additional proposals set forth in the patents noted above, there still exists a need for apparatus of the type described which is more cost effective than the known apparatus.

It is an object of the present invention to provide apparatus which will more nearly satisfy the need described above. In accordance with the principles of the present invention, the above objective is achieved by providing an apparatus for supplying a mixture of water and chemicals to a source of use, such as a tractor-mounted spray tank, from a source of water under pressure, such as a nurse tank assembly, by utilizing the water source to withdraw the chemicals from a container of the chemicals and to rinse the chemicals from the interior of the container. The apparatus comprises an assembly defining an inlet for communication with the source of water under pressure, an outlet for communicating the water and contained chemicals to the source of use, and (1) a full flow path between the inlet and the outlet and (2) a parallel restricted flow path between the inlet and outlet having a venturi restriction therein. Flow control valve mechanisms are provided within both of the flow paths operable (1) in a first position thereof to direct the entire water source communicated with the inlet into the full flow path so that the outlet receives the water under pressure at full flow conditions, (2) in a second position thereof to direct the entire water source communicated with the inlet into the restricted flow path for passage through the venturi restriction and then to the outlet so as to create a negative pressure area within the venturi restriction, and (3) in a third position thereof to block the entire water source communicated with the inlet from reaching the outlet. A chemical-withdrawing conduit is provided in communicating relation with the area of negative pressure. The conduit has an end portion adapted to enter into the interior of a container of chemicals in communication with the chemicals therein so that the negative pressure communicated with the chemical withdrawing conduit serves to withdraw the chemicals from the interior of the container through the chemical-withdrawing conduit into the restricted flow path. A rinse water mechanism is provided for selectively directing rinse water under pressure into the interior of a container from which the chemicals have been withdrawn while the end portion of the chemical-withdrawing conduit is within the interior of the container only when water under pressure is flowing through the venturi restriction to the outlet so that the rinse water directed into the interior of the container will be withdrawn therefrom through the chemical-withdrawing conduit simultaneously as it is being directed therein by said rinse water assembly.

Preferably, the portable unit is a device which includes a portable housing providing a handle by which the housing can be manually moved in portable fashion and having a housing water inlet adapted to be communicated with a source of water under pressure, a housing outlet adapted to be communicated with a source of use of the water under pressure mixed with chemicals, and a water flow path extending from the housing inlet to the housing outlet. A flow control valve is mounted in the housing within the water flow path operable to be manually controlled for movement into (1) an open position allowing water under pressure communicated with the housing inlet to flow through the water flow path and out of the housing outlet and (2) a closed position preventing water under pressure communicated with the housing inlet to flow through the flow path. The water flow path provides a venturi restriction therein between the flow control valve and the housing outlet for creating a negative pressure area within the water flow path. A chemical withdrawing conduit is connected with the housing so as to communicate with the negative pressure area of the water flow path and has a container entering end portion spaced from the housing adapted to communicate with chemicals within the interior of a container for such chemicals so that the negative pressure communicated with the chemical withdrawing conduit will serve to withdraw the chemicals therethrough to be mixed with the water flowing through the venturi restriction. A rinse water assembly is provided which includes a structure for directing rinse water under pressure into the interior of a container after the chemicals have been withdrawn therefrom while the end portion of the chemical withdrawing conduit is within the interior of the container structure for communicating the rinse water directing means with water under pressure within the flow path between the flow control valve and the venturi restriction so that the rinse water directed into the interior of the container will be withdrawn therefrom through the chemical withdrawing conduit simultaneously as it is being directed therein by the rinse water directing structure. The rinse water communicating structure includes a rinse water valve mounted in the housing within the flow path operable to be manually controlled for movement into (1) a closed position blocking communication of water under pressure flowing in the flow path with the rinse water directing structure and (2) in an open position permitting communication of water under pressure flowing in the flow path with the rinse water directing structure.

Preferably, the rinse water direction structure surrounds the end portion of the chemical withdrawing conduit and is mounted thereon for sliding movement with respect thereto for movement into loosely supported relation on the container inlet in an operative position therewith for directing rinse water under pressure into the interior of a container after the chemicals have been withdrawn therefrom while the end portion of the chemical withdrawing conduit is within the interior of the container. The rinse water communicating structure includes a rinse water outlet in the housing within the flow path between the inlet and the venturi restriction and a flexible hose between the rinse water outlet and the rinse water directing structure for communicating water under pressure flowing in the flow path from the rinse water outlet to the rinse water directing structure to be directed thereby in rinsing relation to the interior of the container so that the rinse water will be withdrawn therefrom through the chemical withdrawing conduit, and a rinse water valve in the housing operatively associated with the rinse water outlet for selectively blocking communication of water under pressure flowing in the flow path with the rinse water outlet.

Preferably, the apparatus also includes chemical container supporting device of the type including a portable structure having surfaces for supporting the portable structure in a randomly selected ground position and container engaging surfaces in the portable structure for stably supporting a plurality of chemical containers in a plurality of operative positions therein. The portable structure also includes surfaces for receiving accidental liquid chemical spills from chemical containers supported in the operative positions by the container engaging surfaces. The chemical receiving surfaces define a reservoir into which the chemical receiving surfaces direct liquid chemical spills to accumulate. A screen is provided for insuring that liquid chemical spills accumulating in the reservoir are devoid of particles above a predetermined size. A structure is provided for directing the end portion of the chemical withdrawing conduit of the apparatus into the reservoir.

Another object of the present invention is the provision of apparatus of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is a pictorial elevational view illustrating an apparatus embodying the present invention operatively mounted in a hose extending from the pump of a nurse tank assembly to the spray tank of a tractor-mounted sprayer;

FIG. 2A is a top plan view of the hose connecting unit of the present apparatus;

FIG. 2B is a side elevational view of the portable device of the present apparatus;

FIG. 3 is a fragmentary horizontal sectional view of the hose connected unit of the present apparatus;

FIG. 4 is a fragmentary vertical sectional view of the portable device of the present apparatus;

FIG. 5 is an enlarged fragmentary sectional view taken along the line 5—5 of FIG. 4;

FIG. 6 is a fragmentary vertical sectional view showing the chemical withdrawing conduit of the portable device and the rinse water directing mechanism mounted within the inlet of a chemical container;

FIG. 7 is a side elevational view of the rinse water directing mechanism;

FIG. 8 is a top plan view of the rinse water directing mechanism;

FIG. 9 is an enlarged sectional view taken along the line 9—9 of FIG. 7;

FIG. 10 is an enlarged sectional view taken along the line 10—10 of FIG. 7

Figure 11:
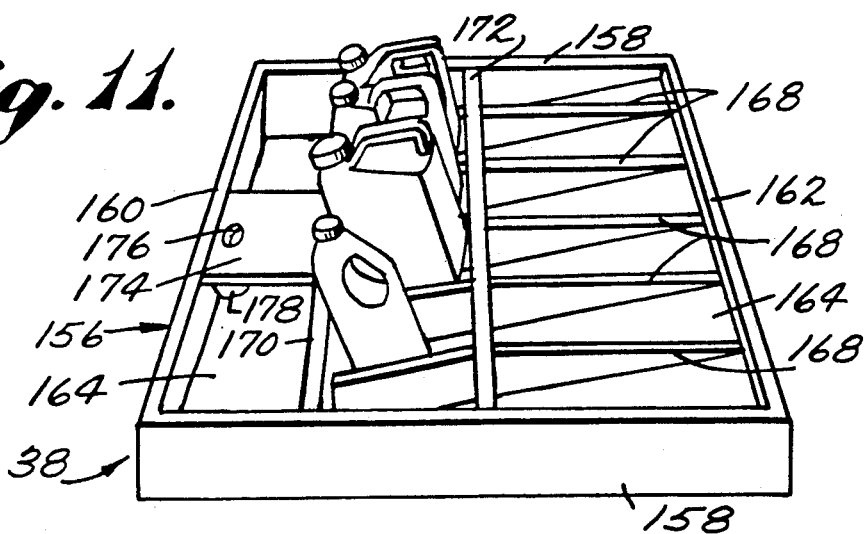
FIG. 11 is a side perspective view of a chemical container supporting device embodying the principles of the present invention.

Referring now more particularly to FIG. 1 of the drawings, there is shown therein an apparatus, generally indicated at 10, which embodies the principles of the present invention. The apparatus 10 includes essentially three interconnected units or assemblies. These include a hose connected unit, generally indicated at 12, a portable unit or device, generally indicated at 14, and a hose assembly, generally indicated at 16, interconnecting the hose connecting unit 12 and the portable device 14.

The apparatus 10 is operable to supply a mixture of water and chemicals to a source of use from a source of water under pressure by utilizing the water source to withdraw the chemicals from a container of the chemicals and to rinse the chemicals from the interior of the container. In FIG. 1, the source of water under pressure is illustrated to be a nurse tank assembly, generally indicated at 18. It is preferable to utilize a nurse tank assembly 18 in conjunction with the present apparatus 10 as the water source since the present apparatus 10 is particularly provided for use in any selected location in the field. The nurse tank assembly 18 is of known construction and includes a wheeled frame 20 which carries a large water supply tank 22. A gasoline engine driven pump assembly 24 is fixed to the wheeled frame 20 and has its suction side connected with the supply tank through a suitable supply hose 26. The pressure side of the pump has a hose 28 connected therewith which is normally used to supply the water to the source of use of the chemical water mixture. FIG. 1 illustrates as the use source a tractor-mounted sprayer 30 having a spray tank 32. The spray tank 32, as shown, is fitted with a valved water inlet coupler 34. The spray tank 32 also includes the usual top opening closed by a removable cap or lid 36. With the valved coupler 34, the end of the hose 28 need not include a control valve but instead can be connected directly with the valved inlet coupler 34, which can be used to cut off the flow to the sprayer tank 32. Where the sprayer tank 32 is not provided with a separate valved inlet coupler 34, the top opening is used to fill the spray tank and it is desirable that the end of the hose 28 has a manual cut-off valve in it to cut off the flow to the spray tank 32.

When the apparatus 10 of the present invention is used in accordance with its preferred mode within a selected field area, it is used in conjunction with a chemical container supporting device, generally indicated at 38, which preferably is constructed in accordance with the principles of the present invention. The supporting device 38 is used to support one or more chemical containers in operative positions so that the operator of the apparatus 10 is enabled to cooperatively interengage the portable device 14 of the present apparatus within the container. Moreover, the hose connecting unit 12 is adapted to be connected within the hose extending from the nurse tank assembly to the spray tank so that the water under pressure therein can be used to withdraw the chemicals from the container and to thereafter wash the chemicals from the interior of the container.

Referring now more particularly to FIGS. 2A and 3 of the drawings, the hose connecting unit 12 of the present apparatus includes a main housing 40 having a water inlet 42 and two water outlets 44 and 46. Connected with the main housing 40 in communication with the inlet 42 is a check valve assembly 48 which, in turn, is connected with a hose section 50 having a hose coupler 52 of conventional construction on the opposite end thereof. The hose coupler 52 is adapted to couple with a hose coupling (not shown) which is adapted to be connected so as to receive the source of water under pressure. The source hose coupling can be connected directly to the pump outlet of the nurse tank assembly 18. However, as shown, it is preferable to interconnect the coupling with a section of hose 28 extending from the pump outlet. In this way, the inlet 42 of the main housing 40 is communicated through the check valve assembly to the source of water under pressure.

Mounted within the main housing 40 for movement between two operating positions is a flow diverting valve mechanism in the form of a three-way valve member 54. In a first of the two operating positions, such as shown in FIG. 3, the flow diverting valve member 54 serves to direct all of the water pressure entering the inlet 42 directly in full flow condition to the outlet 44. The outlet 44 is likewise connected with a hose section 56 which has a conventional hose coupler 58 on the opposite end thereof. As shown, the hose coupler 58 is connected with a hose coupler (not shown) on an end of a hose section 28 and connected with the inlet coupler 36 of the spray tank 32 so that when the three-way valve member 54 is in the position shown in FIG. 3, water from the nurse tank 22 can be pumped under full flow conditions directly into the spray tank 32.

In a second of the two operating positions of the three-way valve member 54 which is a position displaced 90° in a clockwise direction from the position shown in FIG. 3, the three-way valve member serves to direct the water from the inlet 42 into the outlet 46. The outlet 46 is connected with the hose assembly 16 which, in the preferred form shown, includes an inner pressure line 60 and an outer return line 62. As shown, the return line 62 is, for example, of two inch diameter while the pressure line 60 is of one inch diameter and the latter is disposed within the two inch return line 62. One end of the smaller pressure line 60 is connected with the outlet 46 by a connecting tube 63 and the adjacent end of the return line 62 is connected with a manifold housing section 64 which is suitably fixed to the main housing 20. The manifold communicates with a check valve assembly 66 which enables water from the manifold section 64 to pass therethrough into the outlet 44 of the main housing 40 in a position downstream from the three-way valve member 54. Thus, it can be seen that, when the flow diverting valve member 54 is in its second position, the water source is directed into the pressure line 60 which extends to the portable device 14 and the water may return from the portable device 14 through the return line 62 past the check valve 66 to the outlet 44 and then into the spray tank 32.

Referring now more particularly to FIGS. 2B and 4, the portable device 14 includes a housing, generally indicated at 68, which includes a main housing section having a rear portion 70 formed with an inlet 72 therein within which is mounted one end of a connecting pipe 74 the opposite end of which connects with the opposite end of the small pressure line 60. Extending forwardly from the rearward portion 70 of the housing 68 is an upper tubular portion 76, the exterior surface of the rearward section of which defines a handle by which the housing may be manually gripped by the operator so that the operator can manually move the housing in portable fashion. The main section of the housing 68 also includes a forward portion 78 which extends downwardly from the upper tubular portion 76 and a lower tubular portion 80 which extends between the forward portion 78 and the rearward portion 70 in spaced relation to the upper tubular portion 76. The housing 68 also includes a manifold housing section 82 which is fixed to the rear portion 70 of the main section of the housing 68 and extends rearwardly therefrom for connection with the return line 62. The rearward portion 70 of the main section of the housing 68 includes an outlet 84 at the lower tubular portion 80 which communicates with the interior of the manifold housing section 82. In FIG. 4, the outlet 84 is shown as being internally threaded. Such threads, while unnecessary with the hose assembly 16 shown, are included to show that the hose assembly 16 could be simply two similar parallel hose lines, both interconnected like the inner hose line 60 instead of one line within the other.

The main section of the housing 68 includes interior surfaces which define a flow path extending forwardly from the inlet 72 through the upper tubular portion 76, then downwardly through the forward portion 78 and then rearwardly through the lower tubular portion 80 to the outlet 84. Thus, whenever, the flow diverting valve member 54 is in its second position, water under pressure from the source flows through the pressure line 60, inlet pipe 74, through the flow path through the housing and out of the outlet 84 into the manifold housing section 82 for return through the return line 62.

The flow of water under pressure through the flow path in the portable housing 68 is a restricted flow path in comparison with the flow path directly through the three-way valve 54 to the outlet 44 which is at full flow condition. The restriction in the flow path 86 within the portable housing is provided by an insert having a venturi restriction 87 therein which, as shown, is preferably mounted within the lower tubular portion 80 of the housing 68. Thus, all of the flow in the flow path within the housing 68 must pass through the venturi restriction 86 which is communicated through a lateral outlet 88 within the housing 68 with one end of a conduit 90 for enabling chemicals to be withdrawn from containers for such chemicals. As best shown in FIG. 4, the conduit 90 is in the form of a rigid pipe forming a part of a rigid structure extending from the housing 68 for entry of its lower end portion into a chemical container. As shown, the pipe 90 is threaded at its upper end for fixed connection within the outlet 88 in communicating relation with the venturi restriction. The lower end of the pipe 90 is also exteriorly threaded for fixed connection with a check valve assembly 92 forming a part of the rigid structure. The check valve assembly 92 allows the negative pressure which is generated by the flow of liquid through the venturi restriction 86 to be communicated with the interior of a container for chemicals when the lower end portion of the conduit 90 is entered into the interior of the container. The check valve assembly 92 prevents flow of liquid from the conduit 90 into the container.

Referring now more particularly to FIG. 6, wherein the conduit 90 is shown entered through the inlet of a chemical container, it can be seen that the conduit 90 has slidably mounted thereon a rinse water directing structure, generally indicated at 94. As best shown in FIGS. 7-10, the rinse water directing structure 94 includes an inner sleeve 96 which is slidably mounted in surrounding relation to the conduit 90. Extending outwardly from the upper end of the inner sleeve 90 is a flange 98 having a downturned outer edge. Extending downwardly from the flange 98 in closely spaced relation to the inner sleeve 96 is an outer sleeve 100 which is connected at its lower end with the inner sleeve 96. The space between the inner sleeve 96 and the outer sleeve 100 is arranged to receive rinse water for discharge therefrom through a series of rinse water openings 102 formed in the outer sleeve 100. As shown, the openings 102 direct the rinse water communicated with the space between the two sleeves in a slightly upwardly and outwardly extending direction.

Rinse water is communicated with the rinse water directing structure 94 by a communicating assembly which extends from the rinse water directing structure 94 up to the portable housing 68. As shown, the flange 98 of the rinse water directing structure 94 includes an upstanding portion which is internally threaded to receive a nipple 104. A bore 106 extends through the flange 98 from the threaded nipple 104 into communication with the space between the two sleeves of the rinse water directing structure 94. The lower end of a flexible hose 108 is connected with the nipple 104 and the opposite upper end thereof is connected with a nipple 110 threaded into a rinse water outlet 112 formed in the forward portion 78 of the housing 68 adjacent the lower tubular portion 80 thereof in communication with the water flow path therein.

In order to selectively control the communication of water under pressure flowing in the flow path of the housing 68 with the rinse water outlet 112, there is provided in the housing 68 a rinse water valve mechanism, generally indicated at 114. While the valve mechanism 114 may assume any desired configuration, a preferred embodiment is illustrated in FIG. 4 as including an annular valve seat 116 fixed within the interior of the rinse water outlet 112 and a valve having an O-ring valve member 118 and an upwardly extending valve stem 120. The valve member 118 is movable downwardly into engagement with the valve seat 116 and upwardly out of engagement with the valve seat 116 when the valve is moved between closed and opened positions. To this end, the forward portion 78 of the housing 68 includes a wall section 122 extending forwardly into the center thereof. The wall section 122 includes a bore 124 opening vertically downwardly therein within which the valve stem 120 is slidably mounted. An O-ring seal 126 mounted in an annular groove in the valve stem 120 serves to provide a watertight seal between the bore 124 and the valve stem 120. The upper end of the valve stem 120 is guided within the end of the bore 124 and engages a coil spring 128 mounted in the end of the bore 124 which serves to resiliently bias the valve stem 120 downwardly so that the valve member 118 engages the valve seat 116 closing off communication between the water flow path within the housing 68 and the rinse water outlet 112.

The rinse water valve mechanism 114 also includes an actuating means which is in the form of a trigger member 130 which is fixed to the valve stem 120 by any suitable means such as bolts 132 extending through slots 134 within the wall section 122 extending from the central portion of the bore 120 rearwardly to the exterior of the forward housing portion 78. It can be seen that an operator grasping the handle provided by the upper tubular portion 76 can extend the index finger beneath the trigger member 130 and move the trigger member upwardly against the spring action to move the valve member 118 upwardly away from the seat 116 into an open position communicating the water under pressure in the flow path of the housing 68 with the rinse water outlet 112. The water under pressure thus communicated with the rinse water outlet 112 is communicated by the flexible rinse water hose 108 directly with the rinse water directing structure 94. By simply releasing the digital pressure on the trigger member 130, the strength of the spring 128 is sufficient to return the valve member 118 downwardly into engagement with the valve seat 116 into a closed position. It will be noted that, as soon as the rinse water valve is moved into its closed position, the water pressure, in addition to the spring 128, serves to bias the valve member 118 into its closed position since the diameter of the O-ring valve member 118 is greater than the diameter of the O-ring seal 126 on the valve stem 120 which engages the bore 124.

Preferably, the housing 68 is also provided with a flow control valve mechanism, generally indicated at 136, which enables the operator to selectively shut off the flow of water under pressure through the flow path of the housing 68 when the three-way flow diverting valve member 54 is in its second position directing the source of water through the pressure line 60 to the housing 68 of the portable device 14. The flow control valve mechanism is provided in the portable unit to give the operator immediate and convenient control of the flow while he is operating the portable device 14 to withdraw chemicals from a container as to rinse the interior of the container.

While the flow control valve mechanism 136 may assume any desired configuration, a preferred construction is similar to the construction of the rinse water valve mechanism 114. As best shown in FIG. 4, the valve mechanism 136 includes an annular valve seat 138 fixed forwardly within the interior of the upper tubular housing portion 76 and a valve having an O-ring valve member 140 and a rearwardly extending valve stem 142. The valve member 140 is movable forwardly into engagement with the valve seat 138 and rearwardly out of engagement with the valve seat 138 when the flow control valve is moved between closed and opened positions. In this instance, the upper tubular portion 76 of the housing 68 includes a wall section 144 extending downwardly into the center thereof. The wall section 144 includes a bore 146 opening horizontally forwardly therein within which the valve stem 142 is slidably mounted. As before, an O-ring seal 148 is mounted in an annular groove in the valve stem 150 and serves to provide a watertight seal between the bore 146 and the valve stem 142. The rearward end of the valve stem 142 is guided within the end of the bore 146. However, it is freely guided and there is no spring provided similar to the coil spring 128.

The flow control valve mechanism 156 also includes an actuating means which, in this case, is in the form of a thumb-engaging member 150 which is fixed to the valve stem 142 by any suitable means such as bolts 152 extending through a slot 154 within the wall section 144 extending from the central portion of the bore upwardly to the exterior of the upper tubular housing portion 76. It can be seen that an operator grasping the handle provided by the upper tubular portion 76 can extend the thumb onto the thumb-engaging member 150 and move the member rearwardly to move the valve member 140 rearwardly away from the seat 138 into an open position communicating the water under pressure upstream in the flow path downstream to the remainder of the flow path. It will be noted that when the flow control valve is in its open position, the forward end of the valve stem 142 carrying the valve member 140 projects into the flowing water under pressure. The water pressure thus biases the valve stem 142 rearwardly. Thus, without a spring such as the spring 128, the flow control is normally maintained by the water pressure in its open position when not in its closed position. If desired, a biasing detent can also be provided to releasably resist movement of the flow control valve out of its open position. The flow control valve is moved into the closed position shown in FIG. 4 against any water pressure bias present by a simple forward thumb movement in engagement with the member 150. It will be noted that, as soon as the flow control valve is moved into its closed position the water pressure trapped upstream serves to bias the valve member 118 into its closed position since the diameter of the O-ring valve member 140 is greater than the diameter of the O-ring seal 148 on the valve stem 142 which engages the bore 146.

Figure 12:
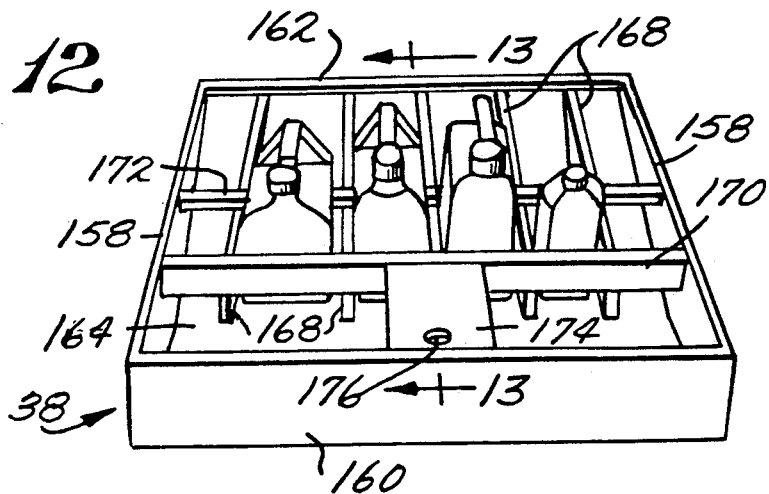
FIG. 12 is a front perspective view of the chemical container supporting device.
Figure 14:
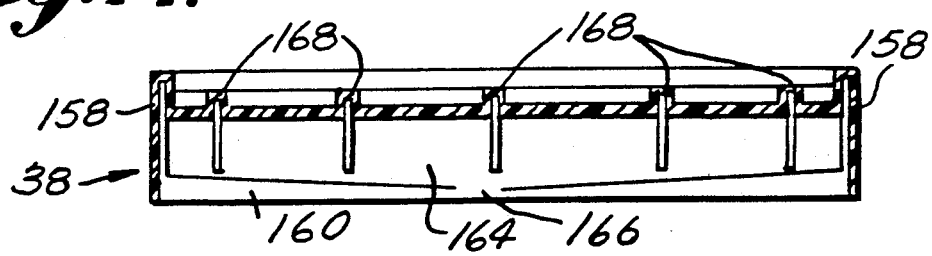
FIG. 14 is a sectional view taken along the line 14—14 of FIG. 13.
Figure 13:
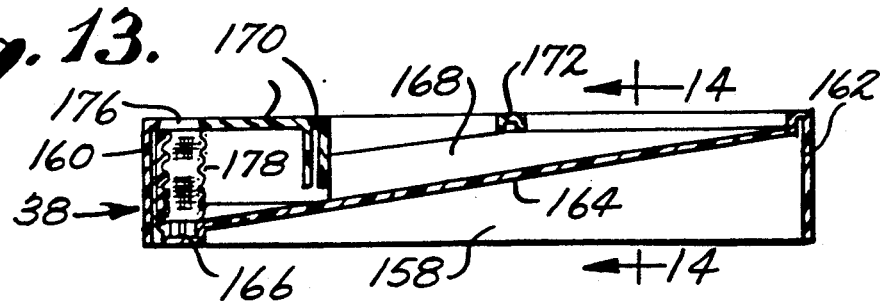
FIG. 13 is a sectional view taken along the line 13—13 of FIG. 12.

Referring now more particularly to FIGS. 11-13, there is shown therein a preferred embodiment of the chemical container supporting device 38. The device comprises a rigid portable structure including a tray-like configuration, generally indicated at 156, which is preferably formed from a sheet of plastic material of suitable thickness by vacuum forming the sheet within an appropriate mold. The tray-like configuration 156 includes a peripheral wall construction which is of rectangular configuration in plan including a pair of side walls 158 interconnected by front and rear walls 158, 160 and 162. All of the peripheral walls 158, 160 and 162 are of inverted U-shape in cross-sectional configuration including an outer leg of generally similar height providing lower surfaces which serve to support the portable structure in a randomly chosen field position. An integral bottom wall 164 includes a periphery which is integral with the inner legs of the peripheral walls at various vertical heights As shown, the bottom wall 164 slants downwardly and forwardly from the rear wall 162 toward the front wall 160 and at a position adjacent the front wall 160, the bottom wall 164 slopes inwardly toward the center where a reservoir 166 is formed in the bottom wall 164. The bottom wall 164 is thus shaped to direct liquid within the peripheral walls downwardly to accumulate in the reservoir 166.

In order to stably support a plurality of containers on the sloping bottom wall 164, the bottom wall is formed with a series of partitions 168 between the side walls 158 in spaced parallel relation with respect thereto. The partitions 168 are also of inverted U-shaped configuration. Adjacent partitions 168 may be spaced apart different distances so as to accommodate containers of different size, as, for example, one gallon containers and two-and-a-half gallon containers.

Since the bottom wall 164 between the partitions 168 is slanted, there is provided a transverse support member 170, which may be an extrusion of inverted U-shaped configuration or of other construction. The transverse member 170 is fixed between the side walls 158 and preferably is also fixed to the partitions 168. To provide rearward confinement, a rearward transverse member 172 is fixed between the side walls 168 in rearwardly spaced relation to the transverse member 170. In addition, a center member 174 is fixed between the central portion of the front wall 160 and the transverse member 170.

The center member 174 includes an opening 176 of a size to receive the lower end portion of the chemical withdrawing conduit 90 therethrough. It will also be noted that the portion of the bottom wall 164 forming the sides of the reservoir 166 may be formed with radially inward projections which engage the lower end portion of the conduit to provide stability. Finally, it will be noted that a cylindrical screen 178 is mounted with its open lower end portion in surrounding relation to the reservoir 166 and its upper end portion in surrounding relation to the opening 176. The screen 178 serves to prevent particles above a predetermined size from laterally entering into the reservoir 166, thus insuring that the liquid withdrawn will be devoid of particles which could cause leakage or wear problems in the system. By providing for the receipt of the chemical withdrawing conduit 90 into the reservoir 166, it is apparent that any chemical spills which accumulate in the reservoir 166 can be readily removed therefrom by simply operating the portable device. The arrangement also provides a convenient means to temporarily store the portable device after a container has been rinsed clean.

OPERATION

The apparatus 10 of the present invention is particularly suited for use in a randomly selected area within the field. The pictorial illustration in FIG. 1 shows such a random area in the field and it will be noted that a nurse tank assembly 18 has been transported to the area along with the tractor-mounted sprayer 30 and the device 10 of the present invention including the chemical container supporting device 38 which is supported on the ground. In the arrangement shown, the hose connecting unit 12 of the present invention has been connected within the hose 28 leading from the outlet of the engine-pump assembly 24 to the valved inlet coupling 36 of the spray tank 32. With this arrangement, the operator has control of the flow of water from the nurse tank assembly into the spray tank 32 by virtue of the valved inlet coupling 36. In the pictorial illustration of FIG. 1, the position of the spray tank 32 is illustrated as close to the engine-pump assembly 24 with only a short length of hose 28 being provided. It will be understood that the spacing can be quite extensive so that it is desirable to provide for control of water flow into the spray tank 32 at a position closely adjacent the spray tank, such as the valved inlet coupling 36. Where a valved inlet coupling 36 is not provided, it is desirable to provide a shut-off valve in the end of the hose 28 so as to enable the operator to feed the water into the open top of the tank with the lid 38 removed with the shut-off valve open.

In the usual situation, the chemical-to-chemical ratio within the mixture finally to be utilized in the spray tank 32 is considerably less than the mixture ratio which is accomplished by virtue of the mixture of the chemical within the water flow when withdrawn by suction from the container. Consequently, in the usual case, after the chemicals are passed into the spray tank, the mixture must be diluted either by water already in the spray tank or water added thereafter. In the usual case, it will be desirable to introduce the dilution water from the nurse tank assembly 18 to the spray tank 32 with the three-way valve 54 in the position shown in FIG. 3 so that the full flow of water to the spray tank 32 can be obtained. This desirable feature of the present apparatus 10 materially shortens the time necessary to achieve the final mixture and enables the apparatus to utilize a venturi restriction 86 which is much smaller and less costly than would be the case if the suction were created by a large venturi accommodating full flow therethrough.

A desirable manner of proceeding, after the engine of the engine-pump assembly has been started, is to open the valved inlet coupler 36 to commence the flow of water into the spray tank 32. The operator then actuates the flow diverting valve 54 to divert the flow from the engine-pump assembly 24 through the portable device 14 via the hose assembly 16. The water which had previously been flowing at full flow rate through the flow diverting valve 54 directly to the outlet 44 and into the spray tank 32 is now restricted, by virtue of the flow through the portable device 14 past the venturi 86 to a lesser flow rate which still is communicated with the outlet 44 and hence to the spray tank 42. Flow through the venturi 86 within the portable device 14 is established with the flow control valve mechanism 136 disposed in its open position. As previously indicated, once the flow control valve mechanism 136 is manually moved into its open position, the water pressure flowing thereby will maintain it in such position. On the other hand, if the flow control valve 136 is in its closed position, water under pressure communicating therewith, as by the flow diverting valve 54 being moved into its second position, will serve to maintain the flow control valve mechanism 136 in its closed position. The operator can then grasp the upper tubular portion 76 of the housing 68 in one hand and, by moving his thumb rearwardly in engagement with the thumb-engaging member 160, the operator can simply manually move the flow control valve 140 rearwardly into its open position permitting the flow to occur within the flow path provided by the housing 68. In this regard, it will be noted that the rinse valve mechanism 114 is maintained in its closed position by virtue of the spring 128. As the water flows through the venturi restriction 86, vacuum or negative pressure is created within the outlet 88 and conduit 90.

Assuming that a chemical container supporting device 38 has been deployed in the randomly selected field area and a container having the chemicals therein which are desired to be mixed has been supported in an operative position between a pair of partitions 168 of the device 38, the operator can then remove the cap of the container and insert the lower end portion of the conduit 90 downwardly through the inlet and into the interior of the container which contains the chemicals taking care to also insure that the rinse water directing structure 94 is properly seated within the container inlet. A typical example is for the chemical to be in liquid form and this form is presumed when the check valve 92 is provided on the end of the conduit. The flow control valve mechanism 136 can be moved into its open position after inserting the conduit 90 within the container. If it has been previously opened, as soon as the lower end of the conduit 90 has been placed in communication with the chemicals within the container, the negative pressure within the conduit 90 serves to withdraw the liquid chemicals from the container up through the opening 88 into the flow of liquid passing through the venturi restriction 86 to be mixed therewith and carried in mixed relation to the spray tank 32. As previously indicated, the mixture ratio of the chemicals as they are added to the water is considerably greater than the mixture ratio which is ultimately to be desired in the spray tank 32. An example of the venturi size utilized is approximately one-half inch in diameter. This is considerably less than the full flow capacity provided by the flow diverting valve 54.

If it is assumed that the amount of chemicals to be added to the mixture are equal to the amount of chemicals within the container, then the operator simply continues to withdraw the chemicals until they are all withdraw and then the rinsing procedures are undertaken. It will be understood that where the amount of chemicals to be used in the spray tank mixture is less than the amount included in the container, the operator is able to judge the amount of liquid withdrawn from the container visually and to shut off the flow with the use of the flow control valve mechanism 136.

It will be noted that the operator will have previously taken care to insure that the rinse water directing structure 94 is entered into the inlet of the container so that the rinse water outlets 102 are within the interior of the container as shown in FIG. 6. The rinse water procedure is commenced by the operator moving the trigger 130 upwardly with the index finger while gripping the handle 76 of the portable housing 68. This movement of the trigger 130 affects movement of the rinse water valve mechanism 114 into its open position allowing water under pressure within the flow path to pass through the nipple 110, the flexible hose 108, the nipple 104 and passage 108 into the space between the inner sleeve 96 and outer sleeve 100 of the rinse water directing structure 96. The water within the space then discharges upwardly and outwardly through the rinse water outlets 102 to strike the interior of the container and provide a rinsing action thereto of any chemicals which may have adhered thereto. As the water flows down the interior of the container, it collects within the lower end of the container and is simultaneously withdrawn through the chemical withdrawing conduit 90 to be mixed with the water flowing through the venturi 86 as before. This mixture is likewise conveyed ultimately into the spray tank 32.

When sufficient rinse water has been passed through the container, the operator releases the trigger 130 to allow the rinse water valve mechanism 114 to move under the action of spring 128 into its closed position and thereafter, by thumb actuation, moves the flow control valve mechanism 136 into its closed position which has the effect of closing off further flow of water through the portable housing 68 and to the spray tank 32. If desired, the portable device can be retained in the container or it can be removed and retained in the container supporting device 38 by inserting the conduit 90 through the opening 176. The operator then moves to the flow diverting valve 54 and moves it into the position shown in FIG. 3 to commence the flow of water directly into the spray tank 32 to achieve the final mixture. When the final mixture is achieved, flow is cut off by the valved inlet flow coupling 36 or the shut-off valve at the end of the hose. It will be understood, however, that it would be possible to utilize the flow diverting valve 54 as a means to shut off the flow, since, if the valve is moved into its second position with the flow control valve mechanism 136 in its closed position, flow to the spray tank 32 will be shut off.

It will be understood that the sliding mount of the rinse water directing structure 94 on the conduit 90 enables the portable device 14 to accommodate containers of various sizes including those greater than the two-and-a-half gallon variety already mentioned. The arrangement is particularly suited to accommodate the one and two-and-a-half gallon containers but can accommodate containers up to thirty gallons. For fifty-five gallon containers and above, an extension must be utilized on the lower end of the pipe 90. It will also be understood that the larger mini-bulk tanks may be accommodated by utilizing a flexible conduit 90 in lieu of the rigid pipe. By providing a flexible conduit, the electric pump provided by the mini-bulk containers can be made to be by-passed while utilizing the meter provided therein.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. Apparatus for supplying a mixture of water and chemicals to a source of use, such as a tractor-mounted spray tank, from a source of water under pressure, such as a nurse tank assembly, by utilizing the water source to withdraw the chemicals from a container of the chemicals and to rinse the chemicals from the interior of the container, said apparatus comprising means defining an inlet for communication with the source of water under pressure, an outlet for communicating the water and contained chemicals to the source of use, and (1) a full flow path between said inlet and said outlet and (2) a parallel restricted flow path between said inlet and outlet having a venturi restriction therein, flow control valve means within both of said flow paths operable (1) in a first position thereof to direct the entire water source communicated with said inlet into said full flow path so that said outlet receives the water under pressure at full flow conditions, (2) in a second position thereof to direct the entire water source communicated with said inlet into said restricted flow path for passage through said venturi restriction and then to said outlet so as to create a negative pressure area within said venturi restriction, and (3) in a third position thereof to block the entire water source communicated with said inlet from reaching said outlet, a chemical-withdrawing conduit communicating with said area of negative pressure and having an end portion adapted to enter into the interior of a container of chemicals in communication with the chemicals therein so that the negative pressure communicated therewith serves to withdraw the chemicals from the interior of the container through the chemical-withdrawing conduit into said restricted flow path, means for directing rinse water under pressure into the interior of a container from which the chemicals have been withdrawn while the end portion of said chemical-withdrawing conduit is within the interior of the container, and means for communicating said rinse water directing means with water under pressure only when water under pressure is flowing through said venturi restriction to said outlet so that the rinse water directed into the interior of the container will be withdrawn therefrom through said chemical-withdrawing conduit simultaneously as it is being directed therein by said rinse water directing means, said rinse water communicating means including rinse water valve means for selectively blocking communication of water under pressure with said rinse water directing means.

2. Apparatus as defined in claim 1 wherein said chemical-withdrawing conduit includes a rigid tubular structure fixed to a portable housing having a handle by which the housing can be manually moved in portable fashion.

3. Apparatus as defined in claim 2 wherein said flow control valve means comprises first valve means operable (1) in a first position thereof to direct the entire water source communicated with said inlet into said full flow path and (2) in a second position thereof to direct the entire water source communicated with said inlet into said restricted flow path and second valve means carried by said portable housing within said restricted flow path in a position between said first valve means and said venturi restriction operable (1) in one position to prevent flow of water under pressure through said restricted flow path when directed therein by said first valve means and (2) in another position to allow flow of water under pressure through said restricted flow path when directed therein by said first valve means.

4. Apparatus as defined in claim 3 wherein the means defining said venturi restriction is within said portable housing.

5. Apparatus as defined in claim 4 wherein said rinse water communicating means communicates with said restricted flow path between said second valve means and said venturi restriction.

6. Apparatus as defined in claim 5 wherein the means defining said inlet and said outlet are disposed in a hose-connected unit within which the means defining the full flow path and said first valve means are disposed, said means defining the restricted flow path includes a flexible hose assembly between said hose-connected unit and said portable housing including a water pressure line communicating between said inlet and said portable housing and a return pressure line between said portable housing and said outlet.

7. Apparatus as defined in claim 6 wherein said portable housing includes an upper tubular portion having an exterior defining said handle and a spaced lower tubular portion, a forward portion connecting forward ends of said upper and lower tubular portions and a rearward portion connecting rearward ends of said upper and lower ends of said upper and lower tubular portions, said means defining the restricted flow path including means in said rearward housing portion defining (1) a housing inlet communicated with said water pressure line and (2) a housing outlet communicated with said return pressure line, and interior surfaces within said housing portions extending from said housing inlet forwardly through said upper tubular portion downwardly through said forward portion and rearwardly through said lower tubular portion into communication with said housing outlet, said rinse water communicating means including a rinse water outlet opening downwardly through the forward housing portion.

8. Apparatus as defined in claim 7 wherein said second valve means includes an annular flow control valve seat within the forward interior of said upper tubular housing portion, and a flow control valve member for engaging said flow control valve seat having a flow control valve stem extending rearwardly therefrom, said upper tubular portion including a central depending wall section therein having a forwardly opening bore therein slidably sealingly receiving said flow control valve stem therein and a slot extending from a central portion of the bore to the upper exterior thereof, said second valve means also including a flow control valve actuating member movable fore and aft along the upper exterior of said upper tubular portion and fixedly connected with said flow control valve stem through the slot in depending wall section.

9. Apparatus as defined in claim 8 wherein said rinse water valve means includes an annular rinse water valve seat within the rinse water outlet and a rinse water valve member for engaging said rinse water valve seat having a rinse water valve stem extending upwardly therefrom, said forward housing portion including a central rearward wall section having a downwardly opening bore therein slidably sealingly receiving said rinse water valve stem therein and a slot extending rearwardly from a central portion of the bore to the exterior of said forward housing portion between said upper and lower tubular portions, said rinse water valve means also including a rinse water actuating member movable up and down along the rearward central exterior of said forward housing portion between said upper and lower tubular housing portions and fixedly connected with said rinse water valve stem through the slot in said rearward wall section.

10. Apparatus as defined in claim 9 wherein said rinse water directing means includes an inner sleeve disposed in sliding surrounding relation with the rigid tubular structure of said chemical withdrawing conduit, a flange extending outwardly from an upper end of said inner sleeve, an outer sleeve extending downwardly from said flange in spaced relation with said inner sleeve and connected at a lower end thereof with a lower end of said inner sleeve, said rinse water communicating means including a flexible hose extending from said rinse water outlet and a rinse water inlet in said flange communicating with said flexible rinse water hose and extending through said flange into communication with the space between said inner and outer sleeves, said outer sleeve having a series of rinse water outlet openings therein, said outer sleeve being of a size smaller than a container inlet so as to engage therewithin and said flange being of a size larger than a container inlet so as to be supportable thereon.

11. Apparatus as defined in claim 10 wherein check valve means is provided for preventing back flow (1) from said use source outlet to said water source inlet with said first valve means either in the first position or the second position thereof and (2) from said chemical withdrawing conduit into a chemical container within which the end portion of said chemical withdrawing conduit is entered.

12. Apparatus as defined in claim 11 including a chemical container supporting device comprising a portable structure having means for supporting the same in a randomly selected ground position, means in said portable structure for stably supporting a plurality of chemical containers in a plurality of operative positions therein, said portable structure including surface means for receiving accidental liquid chemical spills from chemical containers supported in said operative positions by said container supporting means, said chemical receiving surface means defining a reservoir into which said chemical receiving surface means directs liquid chemical spills to accumulate, screen means for insuring that liquid chemical spills accumulating in said reservoir are devoid of particles above a predetermined size and means for directing the end portion of said chemical withdrawing conduit into said reservoir.

13. A device for using a source of water under pressure to withdraw chemicals from a container and for rinsing the chemicals from the container interior with the water source after the chemicals have been withdrawn, said device comprising a portable housing providing a handle by which the housing can be manually moved in portable fashion, a housing water inlet adapted to be communicated with a source of water under pressure, a housing outlet adapted to be communicated with a source of use of the water under pressure mixed with chemicals, means defining a water flow path within said housing extending from said housing inlet to said housing outlet, flow control valve means mounted in said housing within said water flow path operable to be manually controlled for movement into (1) an open position allowing water under pressure communicated with said housing inlet to flow through said water flow path and out of said housing outlet and (2) a closed position preventing water under pressure communicated with said housing inlet to flow through said flow path, said means defining said water flow path providing a venturi restriction therein between said flow control valve means and said housing outlet for creating a negative pressure area within the water flow path, a chemical withdrawing conduit connected with said housing so as to communicate with the negative pressure area of said water flow path and having a container entering end portion spaced from said housing adapted to communicate with chemicals within the interior of a container for such chemicals so that the negative pressure communicated with said chemical withdrawing conduit will serve to withdraw the chemicals therethrough to be mixed with the water flowing through said venturi restriction, means for directing rinse water under pressure into the interior of a container after the chemicals have been withdrawn therefrom while the end portion of said chemical withdrawing conduit is within the interior of the container, and means for communicating said rinse water directing means with water under pressure within said flow path between said flow control valve means and said venturi restriction so that the rinse water directed into the interior of the container will be withdrawn therefrom through said chemical withdrawing conduit simultaneously as it is being directed therein by said rinse water directing means, said rinse water communicating means including rinse water valve means mounted in said housing within said flow path operable to be manually controlled for movement into (1) a closed position blocking communication of water under pressure flowing in said flow path with said rinse water directing means and (2) in an open position permitting communication of water under pressure flowing in said flow path with said rinse water directing means.

14. A device as defined in claim 13 wherein one of said valve means includes first actuating means mounted on said housing for movement between first and second positions by controlled engagement of the thumb of an operator's hand gripping said handle so that the movement of said first actuating means between the first and second positions thereof moves said one valve means between the open and closed positions thereof and the other of said valve means includes second actuating means mounted on said housing for movement between first and second positions by controlled engagement of a finger of an operator's hand gripping said handle so that movement of said second actuating means between the first and second positions thereof moves the other valve means between the open and closed positions thereof.

15. A device as defined in claim 14 wherein said portable housing includes an upper tubular portion having an exterior defining said handle and a spaced lower tubular portion, a forward portion connecting forward ends of said upper and lower tubular portions and a rearward portion connecting rearward ends of said upper and lower ends of said upper and lower tubular portions, said housing inlet and outlet being formed in said rearward portion, said flow path defining means including interior surfaces within said housing portions extending from said inlet forwardly through said upper tubular portion downwardly through said forward portion and rearwardly through said lower tubular portion into communication with said housing outlet, said venturi restriction being defined by interior surfaces in said lower tubular position.

16. A device as defined in claim 15 wherein said flow control valve means includes an annular flow control valve seat within the forward interior of said upper tubular housing portion, and a flow control valve member for engaging said flow control valve seat having a flow control valve stem extending rearwardly therefrom, said upper tubular portion including a central depending wall section therein having a forwardly opening bore therein slidably sealingly receiving said flow control valve stem therein and a slot extending from a central portion of the bore to the upper exterior thereof, said first actuating means including a flow control actuating member movable fore and aft along the upper exterior of said upper tubular portion and fixedly connected with said flow control valve stem through the slot in depending wall section.

17. A device as defined in claim 16 wherein said rinse water communicating means includes a rinse water outlet in the lower end of said forward housing portion, said rinse water valve means including an annular rinse water valve seat within the rinse water outlet and a rinse water valve member for engaging said rinse water valve seat having a rinse water valve stem extending upwardly therefrom, said forward housing portion including a central rearward wall section having a downwardly opening bore therein slidably sealingly receiving said rinse water valve stem therein and a slot extending rearwardly from a central portion of the bore to the exterior of said forward housing portion between said upper and lower tubular portions, said second actuating means including a rinse water actuating member movable up and down along the rearward central exterior of said forward housing portion between said upper and lower tubular housing portions and fixedly connected with said rinse water valve stem through the slot in said rearward wall section.

18. A device as defined in claim 17 wherein said rinse water directing means includes an inner sleeve disposed in sliding surrounding relation with the rigid tubular structure of said chemical withdrawing conduit, a flange extending outwardly from an upper end of said inner sleeve, an outer sleeve extending downwardly from said flange in spaced relation with said inner sleeve and connected at a lower end thereof with a lower end of said inner sleeve, said rinse water communicating means including a flexible hose extending from said rinse water outlet and a rinse water inlet in said flange communicating with said flexible rinse water hose and extending through said flange into communication with the space between said inner and outer sleeves, said outer sleeve having a series of rinse water outlet openings therein, said outer sleeve being of a size smaller than a container inlet so as to engage therewithin and said flange being of a size larger than a container inlet so as to be supportable thereon.

19. A device as defined in claim 18 wherein check valve means is provided within the end portion of said chemical withdrawing conduit for preventing back flow from said chemical withdrawing conduit into a chemical container within which the end portion of said chemical withdrawing conduit is entered.

20. A device for using a source of water under pressure to withdraw chemicals from a container and for rinsing the chemicals from the container interior with the water source after the chemicals have been withdrawn, said device comprising a portable housing providing a handle by which the housing can be manually moved in portable fashion, a housing inlet adapted to be communicated with a source of water under pressure, a housing outlet adapted to be communicated with a source of use of the water under pressure mixed with chemicals, means defining a water flow path within said housing extending from said inlet to said outlet including a venturi restriction therein for creating a negative pressure area within the water flow path, a rigid chemical withdrawing conduit connected with said housing so as to communicate with the negative pressure area of said water flow path and having a container inlet entering end portion spaced from said housing adapted to communicate with chemicals within the bottom interior of a container for such chemicals so that the negative pressure communicated with said chemical withdrawing conduit will serve to withdraw the chemicals therethrough to be mixed with the water flowing through said venturi restriction, rinse water direction means surrounding the end portion of said chemical withdrawing conduit mounted thereon for sliding movement with respect thereto for movement into loosely supported relation on the container inlet in an operative position therewith for directing rinse water under pressure into the interior of a container after the chemicals have been withdrawn therefrom while the end portion of said chemical withdrawing conduit is within the interior of the container, a rinse water outlet in said housing within said flow path between said inlet and said venturi restriction, a flexible hose between said rinse water outlet and said rinse water directing means for communicating water under pressure flowing in said flow path from said rinse water outlet to said rinse water directing means to be directed thereby in rinsing relation to the interior of the container so that the rinse water will be withdrawn therefrom through said chemical withdrawing conduit, and rinse water valve means in said housing operatively associated with said rinse water outlet for selectively blocking communication of water under pressure flowing in said flow path with said rinse water outlet.

21. A device as defined in claim 20 wherein said rinse water directing means includes an inner sleeve disposed in sliding surrounding relation with said chemical withdrawing conduit, a flange extending outwardly from an upper end of said inner sleeve, an outer sleeve extending downwardly from said flange in spaced relation with said inner sleeve and connected at a lower end thereof with a lower end of said inner sleeve, said flange having a rinse water inlet communicating with said flexible rinse water hose and extending therethrough into communication with the space between said inner and outer sleeves, said outer sleeve having a series of rinse water outlet openings therein, said outer sleeve being of a size smaller than a container inlet s as to engage therewithin and said flange being of a size larger than a container inlet so as to be supported thereon.

22. A device as defined in claim 21 wherein check valve means is provided within the end portion of said chemical withdrawing conduit for preventing back flow from said chemical withdrawing conduit into a chemical container within which the end portion of said chemical withdrawing conduit is entered.

23. Apparatus for connection within a hose extending from a nurse tank assembly to a tractor mounted spray tank for utilizing a source of water under pressure within the hose from the nurse tank assembly to withdraw a chemical from a container and thereafter to clean the container in such a way that the chemical is mixed and delivered with the water utilized to the spray tank through the hose, said apparatus comprising a hose connecting unit adapted to be connected in the hose between the nurse tank assembly and the tractor mounted spray tank, a portable unit for cooperating with the chemical container, and flexible hose means extending between said hose connecting unit and said portable unit providing a water pressure line and a return pressure line, said hose connecting unit including a water pressure inlet adapted to be connected with the hose on the nurse tank side thereof for receiving water under pressure from the nurse tank, a water pressure outlet communicating said water pressure line, a return pressure inlet communicating with said return pressure line, a return pressure outlet communicating with said return pressure inlet and adapted to be connected with the hose on the spray tank side thereof, flow directing valve means in said hose connecting unit movable into (1) a first position communicating water under pressure received in said water pressure inlet to said water pressure outlet and (2) a second position communicating water under pressure received in said water pressure inlet to said return pressure outlet, said portable unit including a housing having a handle by which said housing can be manually moved in portable fashion, a housing inlet communicating with said water pressure line so as to receive water under pressure from said water pressure line, a housing outlet communicating with said return pressure line, means defining a water flow path within said housing between said housing inlet and said housing outlet including a venturi restriction in said water flow path for creating a negative pressure area within the water under pressure flowing within said water flow path, a conduit fixed to said housing in communication with said negative pressure area and having an end portion spaced from said housing adapted to be disposed within a chemical container in communicating relation with chemicals contained therein so that the negative pressure communicated with said conduit will cause the chemicals within the container to be moved through the conduit and mixed with the water flowing through said venturi restriction, flow control valve means within said water flow path between said housing water pressure inlet and said venturi restriction controllable by an operator manually grasping said handle to move into (1) an open position allowing flow within said flow path and (2) a closed position preventing flow within said flow path, a rinse water outlet formed in said housing in communication with said water flow path between said venturi restriction and said flow control valve means, rinse water valve means within said housing controllable by an operator manually grasping said handle to move into (1) an open position allowing communication between said water flow path and said rinse water outlet and (2) a closed position preventing communication of said water flow path with said rinse water outlet, and means for connecting said rinse water outlet with the interior of a chemical container when the chemicals have been withdrawn from the container through said conduit so that when said rinse water valve means is in said open position a portion of the water under pressure flowing in said water flow path will be diverted into the interior of the container to rinse the interior thereof after which the rinse water is withdrawn through said conduit.

24. Apparatus as defined in claim 23 wherein said water pressure line is disposed within said return pressure line.

25. Apparatus as defined in claim 23 wherein said portable housing includes an upper tubular portion having an exterior defining said handle and a spaced lower tubular portion, a forward portion connecting forward ends of said upper and lower tubular portions and a rearward portion connecting rearward ends of said upper and lower ends of said upper and lower tubular portions, said means defining the restricted flow path including means in said rearward housing portion defining (1) said housing inlet communicating with said water pressure line and (2) said housing outlet communicating with said return pressure line, and interior surfaces within said housing portions extending from said housing inlet forwardly through said upper tubular portion downwardly through said forward portion and rearwardly through said lower tubular portion into communication with said housing outlet, said rinse water outlet opening downwardly through the forward housing portion.

26. Apparatus as defined in claim 23 wherein said flow control valve means includes an annular flow control valve seat within the forward interior of said upper tubular housing portion, and a flow control valve member for engaging said flow control valve seat having a flow control valve stem extending rearwardly therefrom, said upper tubular portion including a central depending wall section therein having a forwardly opening bore therein slidably sealingly receiving said flow control valve stem therein and a slot extending from a central portion of the bore to the upper exterior thereof, said flow control valve means also including a flow control valve actuating member movable fore and aft along the upper exterior of said upper tubular portion and fixedly connected with said flow control valve stem through the slot in depending wall section.

27. Apparatus as defined in claim 23 wherein said rinse water valve means includes an annular rinse water valve seat within the rinse water outlet and a rinse water valve member for engaging said rinse water valve seat having a rinse water valve stem extending upwardly therefrom, said forward housing portion including a central rearward wall section having a downwardly opening bore therein slidably sealingly receiving said rinse water valve stem therein and a slot extending rearwardly from a central portion of the bore to the exterior of said forward housing portion between said upper and lower tubular portions, said rinse water valve means also including a rinse water actuating member movable up and down along the rearward central exterior of said forward housing portion between said upper and lower tubular housing portions and fixedly connected with said rinse water valve stem through the slot in said rearward wall section.

28. Apparatus as defined in claim 23 wherein said rinse water outlet connecting means includes an inner sleeve disposed in sliding surrounding relation with said conduit, a flange extending outwardly from an upper end of said inner sleeve, an outer sleeve extending downwardly from said flange in spaced relation with said inner sleeve and connected at a lower end thereof with a lower end of said inner sleeve, a flexible rinse water hose extending from said rinse water outlet and a rinse water inlet in said flange communicating with said flexible rinse water hose and extending through said flange into communication with the space between said inner and outer sleeves, said outer sleeve having a series of rinse water outlet openings therein, said outer sleeve being of a size smaller than a container inlet so as to engage therewithin and said flange being of a size larger than a container inlet so as to be supportable thereon.

29. Apparatus as defined in claim 23 wherein check valve means is provided for preventing back flow (1) from said use source outlet to said water source inlet with said first valve means either in the first position or the second position thereof and (2) from said chemical withdrawing conduit into a chemical container within which the end portion of said chemical withdrawing conduit is entered.

30. Apparatus as defined in claim 23 including a chemical container supporting device comprising a portable structure having means for supporting the same in a randomly selected ground position, means in said portable structure for stably supporting a plurality of chemical containers in a plurality of operative positions therein, said portable structure including surface means for receiving accidental liquid chemical spills from chemical containers supported in said operative positions by said container supporting means, said chemical receiving surface means defining a reservoir into which said chemical receiving surface means directs liquid chemical spills to accumulate, screen means for insuring that liquid chemical spills accumulating in said reservoir are devoid of particles above a predetermined size and means for directing the end portion of said chemical withdrawing conduit into said reservoir.

* * * * *